(12) United States Patent
Amagi et al.

(10) Patent No.: US 7,147,929 B2
(45) Date of Patent: Dec. 12, 2006

(54) METHOD OF MANUFACTURING A RESIN-MOLDED STATOR

(75) Inventors: Shigeo Amagi, Tokai (JP); Osamu Koizumi, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/217,449

(22) Filed: Sep. 2, 2005

(65) Prior Publication Data
US 2005/0285456 A1    Dec. 29, 2005

Related U.S. Application Data

(62) Division of application No. 10/390,680, filed on Mar. 19, 2003, now Pat. No. 7,067,943.

(30) Foreign Application Priority Data
Sep. 27, 2002    (JP) .............................. 2002-282563

(51) Int. Cl.
| | |
|---|---|
| G11B 7/253 | (2006.01) |
| G11B 7/24 | (2006.01) |
| H02K 3/30 | (2006.01) |
| H02K 5/00 | (2006.01) |
| H02K 15/00 | (2006.01) |
| G11B 11/105 | (2006.01) |
| G11B 11/00 | (2006.01) |
| C08J 11/00 | (2006.01) |

(52) U.S. Cl. .................... 428/480; 310/43; 310/89; 428/328; 428/458; 525/437; 525/444; 524/439

(58) Field of Classification Search ................ 310/43, 310/216, 89; 29/596, 598; 428/480, 458, 428/328; 525/437, 444; 524/439; 523/526; 264/272.2, 279.1, 328.2, 331.17
See application file for complete search history.

(56) References Cited

U.S. PATENT DOCUMENTS

| | | | | |
|---|---|---|---|---|
| 2,922,902 A | * | 1/1960 | Hargreaves | .................. 310/43 |
| 3,979,822 A | * | 9/1976 | Halm | ........................... 29/596 |
| 4,048,530 A | * | 9/1977 | Kaufman, Jr. | ............... 310/89 |
| 5,969,009 A | | 10/1999 | Terada et al. | |
| 5,990,247 A | | 11/1999 | Terada et al. | |
| 6,069,421 A | | 5/2000 | Smith et al. | |

(Continued)

FOREIGN PATENT DOCUMENTS

JP    51-118002    10/1976

(Continued)

*Primary Examiner*—Tran Nguyen
(74) *Attorney, Agent, or Firm*—Crowell & Moring LLP (57) ABSTRACT

A highly reliable resin-molded stator not suffering insulation breakdown between the different phases of the stator coils even when the operation mode where the output of a rotary machine using a resin-molded stator in which a stator coil wound around a plurality of slots and a stator coil provided at the stator core end are resin-molded is to be increased from the level under a stopped status to the maximum achievable level within a short time is repeated. Also disclosed is a method of manufacturing such a stator, and a rotary machine using the same. The resin-molded stator of the present invention comprises a stator core, electrically insulated stator coils wound around the plurality of slots or protrusions provided in the axial direction of the stator core, and molding resin with which are molded the stator core and the stator coils located at the aforementioned slots or protrusions and at the stator core end, wherein the resin-molded stator is characterized in that non-adhesive structure is established between the molding resin and at least one of the end faces of the stator core.

8 Claims, 4 Drawing Sheets

U.S. PATENT DOCUMENTS

| | | |
|---|---|---|
| 6,069,431 A | 5/2000 | Terada et al. |
| 6,125,098 A | 9/2000 | Osawa |
| 6,177,751 B1 | 1/2001 | Suzuki et al. |
| 6,673,463 B1 | 1/2004 | Onishi et al. |
| 6,844,651 B1 * | 1/2005 | Swift et al. ............... 310/214 |

FOREIGN PATENT DOCUMENTS

| | | |
|---|---|---|
| JP | 08-223866 | 8/1995 |
| JP | 07-298538 | 11/1995 |
| JP | 9-9589 | 1/1997 |
| JP | 09-157440 | 6/1997 |
| JP | 10-051989 | 2/1998 |
| JP | 2000-125513 | 4/2000 |
| JP | 2002-078267 | 3/2002 |
| JP | 2002-186215 | 6/2002 |
| JP | 2002-218720 | 8/2002 |

* cited by examiner

METHOD OF MANUFACTURING A RESIN-MOLDED STATOR

This application is a division of patent application Ser. No. 10/390,680, filed Mar. 19, 2003, now U.S. Pat. No. 7,067,943 the entire disclosure of which is incorporated herein by reference. Priority is claimed based on Japanese Patent Application No. 2002-282563, filed Sep. 27, 2002.

BACKGROUND OF THE INVENTION

1. Field of the Invention

The present invention relates to a resin-molded stator, a method of manufacturing the same, and a rotary machine using the same.

2. Description of the Prior Art

Conventional resin-molded stators and rotary machines using the same employ the structure where, as disclosed in Japanese Application Patent Laid-Open Publication No. 08-223866, Japanese Application Patent Laid-Open Publication No. 09-157440, and Japanese Application Patent Laid-Open Publication No. 10-51989, the stator coil wound around the plurality of slots or bumps in the stator core, and the stator coil at the end of the stator core are molded with resin and the molding resin and the end of the stator core that faces in the axial direction of the rotary machine are bonded. Also, an alternating-current (AC) power generator using brushes to supply power to the rotor is disclosed in Japanese Application Patent Laid-Open Publication No. 2000-125513.

The present inventors have found that the prior art practice poses the problem that when a stringent acceleration test simulating the operation mode in which the output of the rotary machine is to be increased from the level under its stopped status to the maximum achievable level within a short time is repeated several times, insulation breakdown occurs between the stator coils and the ground or between the different phases of the stator coils. It is considered that the insulation breakdown occurs as follows:

It has been examined why and how the insulation breakdown occurs between the stator coils and the ground or between the different phases of the stator coils when the operation mode in which the output of the rotary machine is to be increased from the level under its stopped status to the maximum achievable level within a short time is repeated several times. As a result, it has been found that when the output level is increased to its maximum within a short time, the stator coils are heated by the electrical resistance of the coil conductor and, depending on the particular conditions, the coil temperature increases to a maximum of about 250° C. At the same time, it has also been found that since the heat capacity of the stator core is high, increases in the temperature thereof retard with respect to the stator coils. Accordingly, the difference in temperature between the stator coils and the stator core often reaches 200° C. or more.

The thermal expansion coefficient of the copper used for the stator coils is $1.7\times10^{-5}$ $1/°$ C., and the thermal expansion coefficient of the stator core in the direction that electromagnetic steel plates were laminated in the direction of the rotational axis of the stator core to form the core is about $1.3\times10^{-5}$ $1/°$ C. In this way, the stator coils and the stator core differ in thermal expansion coefficient, and when a temperature difference exists between the stator coils and the stator core, the amount of thermal elongation also differs between both. The resin-molded stator may have the structure where one side of its coil end is constrained by being positioned between the stator core and the end face of the housing in the direction of its rotational axis in the rotary machine. The relative displacement $\Delta$ occurring between the stator coils and the stator core, at the coil end of a resin-molded stator having such structure, is represented by formula (1) below.

$$\Delta=\{\alpha c\times(Tc-Tr)-\alpha f\times(Tf-Tr)\}\times L \quad (1)$$

where: "$\alpha c$" and "$\alpha f$" are the thermal expansion coefficients of the stator coils and the stator core, respectively; "Tc" and "Tf" are the temperatures of the stator coils and stator core when the output of the rotary machine is increased to the maximum output level within a short time; "Tr" is the temperature at which the difference between the stator coils and the stator core in terms of thermal elongation is zero, and; "L" is the laminating thickness of the stator core.

For example, if the laminating diameter of the stator core in a resin-molded stator having the structure where one side of its coil end is constrained by being positioned between the end face of the housing and the stator core is 100 mm, when the temperature of the stator coils increases from 20° C. to 230° C. and the temperature of the stator core increases from 20° C. to 50° C. the relative displacement $\Delta$ occurring between the stator coils and stator core at the coil end can be calculated by assigning, to formula (1) shown above, an "$\alpha c$" value of $1.7\times10^{-5}$ $1/°$ C. as the thermal expansion coefficient of the stator coils, an "$\alpha f$" value of $1.3\times10^{-5}$ $1/°$ C. as the thermal expansion coefficient of the stator core, a "Tc" value of 230° C. as the temperature of the stator coils, a "Tf" value of 50° C. as the temperature of the stator core, a "Tr" value of 20° C. as the temperature at which the difference between the stator coils and the stator core in terms of thermal elongation is zero, and an "L" value of 100 mm as the laminating thickness of the stator core. As a result, it follows from the difference in thermal elongation that the relative displacement $\Delta$ occurring between the stator coils and stator core at the coil end is 0.35 mm.

The stress "$\sigma c$" applied to the stator coil section when the space between the stator core and the stator coils is constrained so as not to cause relative displacement between both can be represented using the following formula (2) which assumes that all thermal strain is imposed on the stator coils:

$$\sigma c=\Delta\times Ec/L \quad (2)$$

where "$\Delta$" is the relative displacement between the stator coils and stator core at the coil end, "Ec" is the longitudinal elastic modulus of the stator coils, and "L" is the laminating thickness of the stator core. If "$\Delta$", "Ec", and "L" are 0.35 mm, 100 GPa, and 100 mm, respectively, the stress "$\sigma c$" applied to the stator coils reaches 0.35 GPa.

The stator coils running through the stator slots and emerging at the coil end are split into sections wound clockwise and counterclockwise around the stator core according to phase and engage with other stator slots. Accordingly, the coils wound from a plurality of stator slots towards other stator slots are accommodated under a mutual contact status at the coil end section of the stator. In this case, if the stator core and the resin-molded section at the coil end are bonded, a thermal elongation difference reaching 0.35 mm occurs between the stator core and stator coils at the coil end, and at the same time, since the stator coils emerging at the coil end are wound in different directions for each phase, a phase shift occurs between the coils of different phases and is likely to damage the insulation around the conductors, resulting in insulation breakdown. The same also applies to concentrated-winding structure having coils wound at the protrusions of the stator core. That is to say, if the stator core and the resin-molded section at the coil end are bonded, the difference in thermal elongation between the conductors and the core due to abrupt increases in the temperature of the conductors causes the buckling thereof and is likely to damage the insulation, and resulting in insulation breakdown.

SUMMARY OF THE INVENTION

The object of the present invention is to provide a resin-molded stator in which the stator coils wound around a plurality of slots and the stator coils at the end of the stator core are molded with resin in order for insulation breakdown between the stator coils and the ground or between the different phases of the stator coils to be prevented by repeating several times the operation mode in which the output level of a rotary machine employing the aforementioned resin-molded stator is to be increased from the level under a stopped status to the maximum level within a short time, a method of manufacturing the resin-molded stator outlined above, and a rotary machine using the same.

The present invention applies to a resin-molded stator comprising a stator core, stator coils wound around said stator core and provided with insulation, and molding resin with which the stator core and said stator coils are molded, wherein said resin-molded stator is characterized in that said molding resin has non-adhesive structure against at least one of the end faces of the stator core. The particles of aluminum oxide, magnesium oxide, silicon oxide, boron nitride, calcium carbonate, talc, or the like are added as an inorganic filler to the molding resin.

The resin-molded stator pertaining to the present invention is further characterized in that a non-adhesive film or separator for obtaining non-adhesion against said resin is formed as non-adhesive structure between said molding resin and at least one of said end faces of the stator core. Polytetrafluoroethylene, polyvinylidene fluoride, polyvinyl fluoride, and the like are used in bridged form as the non-adhesive film, and this film is not fusible with respect to the aforementioned mold. Or silicon is used as the separator.

In other words, in the present invention, the resin-molded stator where the stator coils provided with insulation are wound around the plurality of slots or protrusions provided in the axial direction of the stator core and the stator core, the stator coils around the slots or protrusions, and the stator coils at the stator core end, is characterized in that non-adhesive structure is provided between the molding resin and said end face of the stator core.

A rotary machine may need to be operated at its maximum output level at the same time the machine is started. When the rotary machine is actually placed in such operation, the temperature of its stator coils will increase to about 250° C. by the action of Joule heat. However, since the stator core has a large heat capacity, increases in the temperature of the stator core are retarded with respect to the stator coils by the thermal resistance of the electric insulating material located between the stator coils and the stator core, and for this reason, the temperature of the stator core often reaches only about 50° C., even when the temperature of the stator coils reaches 250° C. In the present invention, the differences in the amount of thermal elongation that result, at that time, from the thermal expansion coefficient of the stator core in the laminating direction of electromagnetic steel plates in the direction of the rotational axis of the stator core, from the difference in temperature between and the stator coils and the stator core, and from the difference in thermal expansion coefficient between both, are absorbed by providing non-adhesive structure between the molding resin and the end face of the stator core so as to prevent coil damage.

It is preferable that the above-mentioned molding resin should be made of the polyester-based resin containing an inorganic filler, that the inorganic filler should contain calcium carbonate and aluminum oxide, and that the above-mentioned non-adhesive film should be polytetrafluoroethylene resin.

The present invention also applies to a resin-molded stator manufacturing method characterized in that it sequentially comprises a process in which stator coils provided with insulation are to be wound around a plurality of slots or protrusions formed in the axial direction of a stator core consisting of laminated electromagnetic steel plates, and a process in which the end face of said stator core is to be axially provided with a resin film or separator having the same shape as that of the vertical section of the stator core, and further characterized in that said manufacturing method sequentially comprises a process in which, after the above-described process, the stator core around which said stator coils are wound is to be built into a housing, a process in which the aforementioned housing with the stator core built thereinto is to be preheated and then set in a preheated mold, and a molding process in which the stator core and the stator coils located at the above-mentioned slots or protrusions and at the end of the stator core are to be molded with resin by injecting the resin into the mold having the housing set therein.

In addition, in the present invention, by providing, between the housing of the rotary machine and the molding resin at the coil end where the stator coils were molded, insert structure in which the housing and the molding resin can be moved in the respective axial directions and cannot be moved about the respective axes, it is possible to suppress the vibrational displacement associated with operation that occurs between the stator coil at the stator slot portion and the stator coil at the resin-molded coil end portion, and hereby to prevent stator coil damage.

If the size (W) of a space formed in the axial direction of the rotary machine, between the coil end portion provided with resin molding by providing non-adhesive structure with respect to the end face of the stator core, is smaller than the value derived from the product of (A×T×Lc) [A is the thermal expansion coefficient of the stator coil conductor, T is the maximum temperature that the conductor reaches during the operation of the rotary machine, and Lc is the total axial length of the conductor that includes said coil end], when the temperature of the conductor increases, the coil end portion provided with non-adhesive structure with respect to the end face of the stator core will come into contact with the components mounted at the end plate and consequently the effect that should originally be obtainable by providing the non-adhesive structure will not be created. This problem, however, can be solved by setting the size (W) of the above-mentioned space to a value equal to, or greater than, the value derived from the above-mentioned value of (A×T×Lc).

The rotary machine pertaining to the present invention is characterized in that the rotary machine comprises a rear plate for covering the other side of said rotor, a brush assembly for supplying electric power via slip rings provided on the rotor, a rear bracket connected to said rear plate and intended for covering the brush assembly, a bearing which supports one end of the rotor and is provided in the housing, and a bearing which supports the other end of said rotor and is provided in the rear plate.

The rotary machine pertaining to the present invention is further characterized in that the rotary machine comprises an end plate for covering the other side of said rotor, a bearing which supports one end of said rotor and is provided in said housing, and a bearing which supports the other end of said rotor and is provided in said end plate.

It is preferable that the sections of the above-mentioned housing that are to accommodate the resin-molded stator and one side of the rotor built into the stator should be formed into a single unit, that a space for absorbing the thermal expansion of the stator coils in their axial direction should be provided at the side having the non-adhesive structure described above, that the above-mentioned should be provided between the molding resin of the stator coils and the rear plate or between the molding resin of the stator coils and the end plate, and that there should be insert structure in which the axial length of the housing at its inner circumferential side should be greater than the axial length of the resin-molded stator and the housing and the molding resin separated from the stator core by the non-adhesive structure provided at the core end of the stator can be moved in the respective axial directions and cannot be moved about the respective axes.

According to the present invention, it is possible not only to provide a highly reliable resin-molded stator not suffering insulation breakdown between the different phases of the stator coils even when the operation mode for increasing the output of a rotary machine from the level under its stopped status to the maximum achievable level within a short time is repeated, but also to provide a rotary machine that uses such a stator.

DESCRIPTION OF THE PREFERRED EMBODIMENTS (Embodiment 1)

Figure 1:
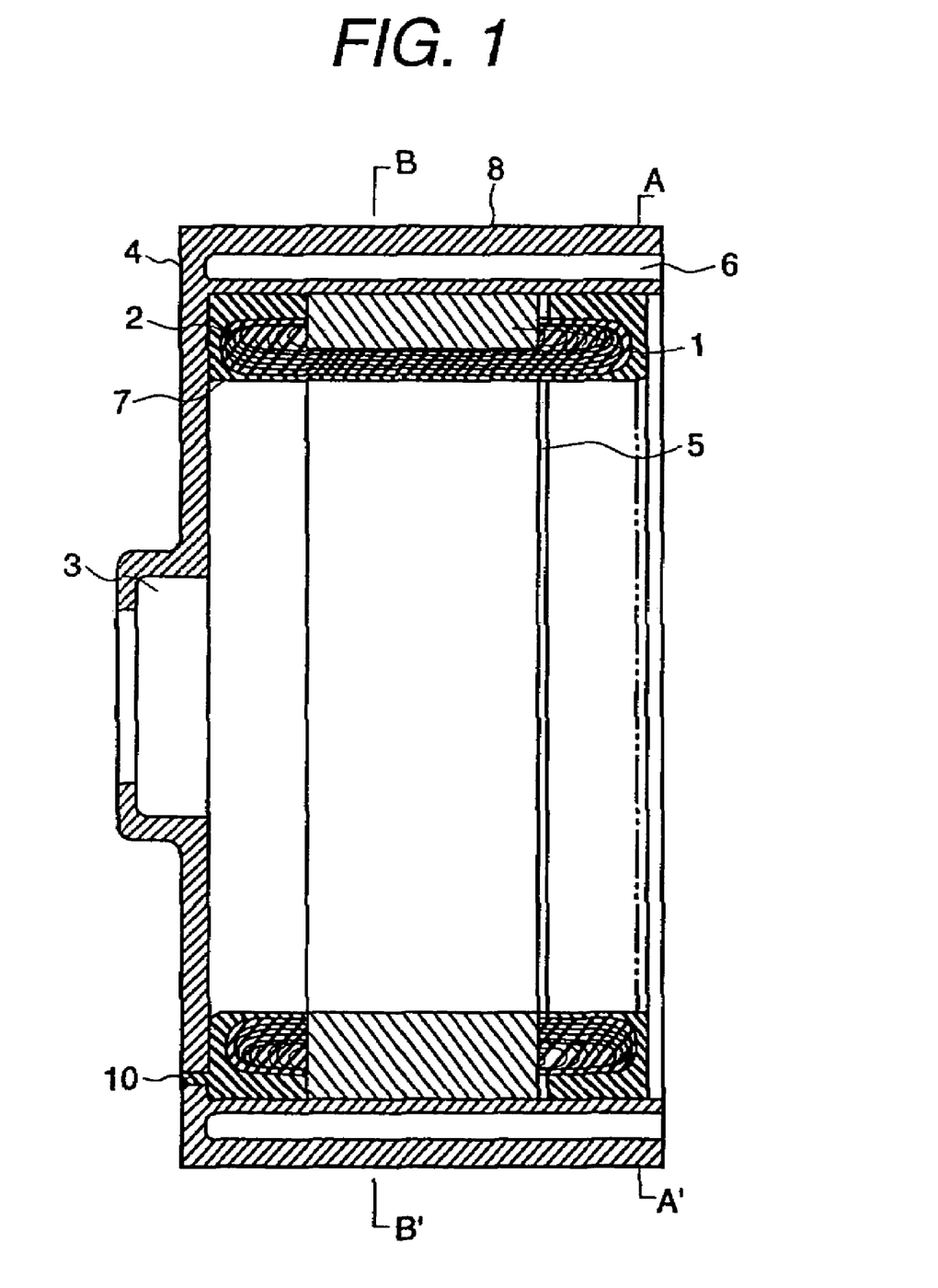
FIG. 1 is a cross-sectional view of the resin-molded stator pertaining to the present invention.
Figure 2:
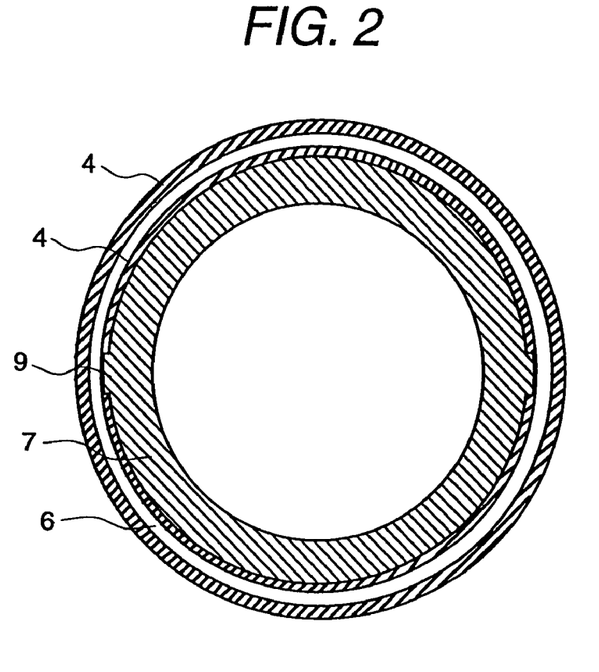
FIG. 2 is a cross-sectional view of the section A–A' in FIG. 1.
Figure 3:
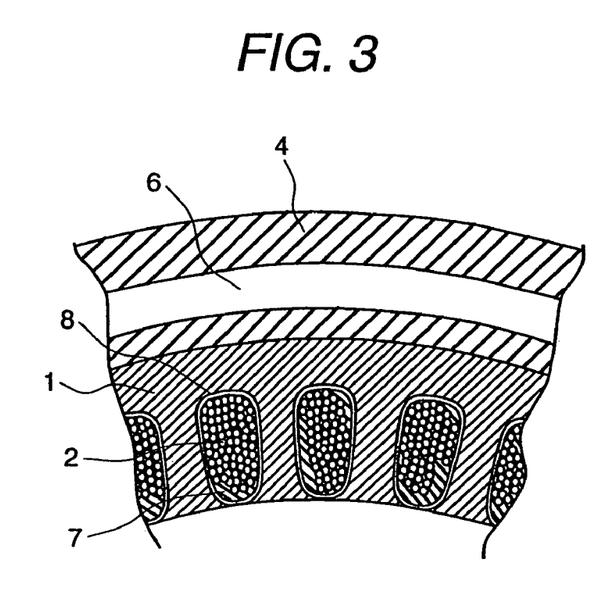
FIG. 3 is a partial cross-sectional view of the rotary machine pertaining to the present invention.

FIG. 1 is a cross-sectional view of the resin-molded stator showing an embodiment of the present invention. FIG. 2 is a cross-sectional view of the section A–A' in FIG. 1, and FIG. 3 is a cross-sectional view of the section B–B' in FIG. 2. The steps taken to manufacture this resin-molded stator are described below. A slot provided in a stator core 1 consisting of laminated electromagnetic steel plates is covered with a liner 8 which is made of a polyamideimides non-woven fabric, and then stator coils 2 each consisting of a conductor provided with insulation are wound around the stator core 1. After this, the stator core 1 around which the stator coils 2 have been wound is built into a housing 4 which has a bearing installation recess 3 at the end of the housing. Of the two surfaces vertical to the axis of the stator core 2, only the surface located at the opposite side to the bearing installation recess 3 in the housing 4 when the stator core 1 is to be built into the housing is coated with a polytetrafluoroethylene resin film which has been pre-processed into the same shape as that of the electromagnetic steel plates of the stator core 1, and the coated surface mentioned above functions as a non-adhesive treatment section 5 to prevent bonding between the stator core 1 and the molding resin 7 to be later added.

The polytetrafluoroethylene resin film is bridged, does not fuse during molding, and functions as non-adhesive structure. Although, in the present embodiment, the resin film is formed as a non-adhesive treatment section 5 between molding resin and stator core at one side, this film can also be provided at both sides. In the present embodiment, as shown in FIG. 1, since the resin film also functions as a mold for resin-molding the housing 4 located at one side, this film gives non-adhesiveness to one side. In the housing 4, a plurality of injection-molding gate positions 10 functioning as resin injection ports for resin-molding the housing 4 are provided circumferentially on the side thereof so as to ensure equal injection of the resin, and these gates are filled with the molding resin. Molds are provided at the opposite side to the resin injection ports and at the inner circumferential side.

The housing 4 is also provided with an agency 6 through which the coolant for cooling the rotary machine is to be passed. Next, the housing 4 into which the stator core 1 with the stator coils 2 wound around it, is preheated to 100° C. and then set in a mold which has been heated to 150° C. beforehand. After this, the polyester-based molding resin that has been filled with the powder of calcium carbonate and aluminum oxide is injection-molded at a pressure of 4 MPa, and hereby, the stator coil 2 inside the slot of the stator core 1 and the stator coil 2 at the coil end emerging from the stator core 1 are molded. As shown in FIG. 2, a recess 9 for preventing the rotational vibration of the coil end portion is provided in the housing 4.

Two types of resin are available as examples of the polyester-based molding resin mentioned above: (1) molding resin created by mixing resin, calcium carbonate powder, and alumina powder at the weight rate of 1:1:1, with the resin consisting of 100 weight parts of maleic acid-containing unsaturated polyester and 40 weight parts of styrene monomer, and (2) molding resin created by mixing resin, calcium carbonate powder, and alumina powder at the weight rate of 1:1:1, with the resin consisting of 100 weight parts of isophthalic acid-containing unsaturated polyester and 40 weight parts of styrene monomer.

Figure 4:
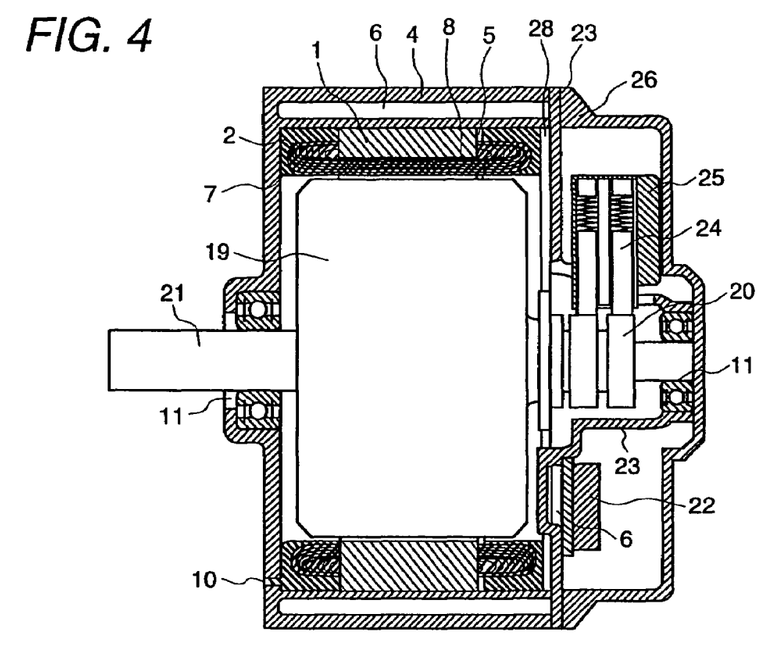
FIG. 4 is a partial side view of a conventional rotary machine.

FIG. 4 is a cross-sectional view of the rotary machine pertaining to the present invention. A rotor 19 and a shaft 21 having slip rings 20 built thereinto are attached to the resin-molded stator shown in FIG. 1. After this, rear plates 23 which have a diode 22 and the like, are attached, then a brush assembly 24 and a regulator 25 are installed, and a rear bracket 26 is installed. The axial length (W) of a coil end space 28 provided between the resin-molded section at the coil end portion and the rear plate 23 is set to a value equal to, or greater than, the value derived from the product of (A×T×Lc), where A is the thermal expansion coefficient of the stator coil conductor, T is the maximum temperature that the conductor reaches during the operation of the rotary machine, and Lc is the total axial length of the conductor that includes said coil end.

A stringent acceleration test for increasing the output of the thus-manufactured rotary machine from the level under its stopped status to the maximum achievable level within a short time has been repeated five times, with the result that no abnormality has been observed. Although an example of a rotary machine with slip rings, a brush assembly, and a diode, has been shown in the present embodiment, it is obvious that the embodiment can be similarly applied to a rotary machine not equipped with these components.

COMPARATIVE EXAMPLE 1

Figure 5:
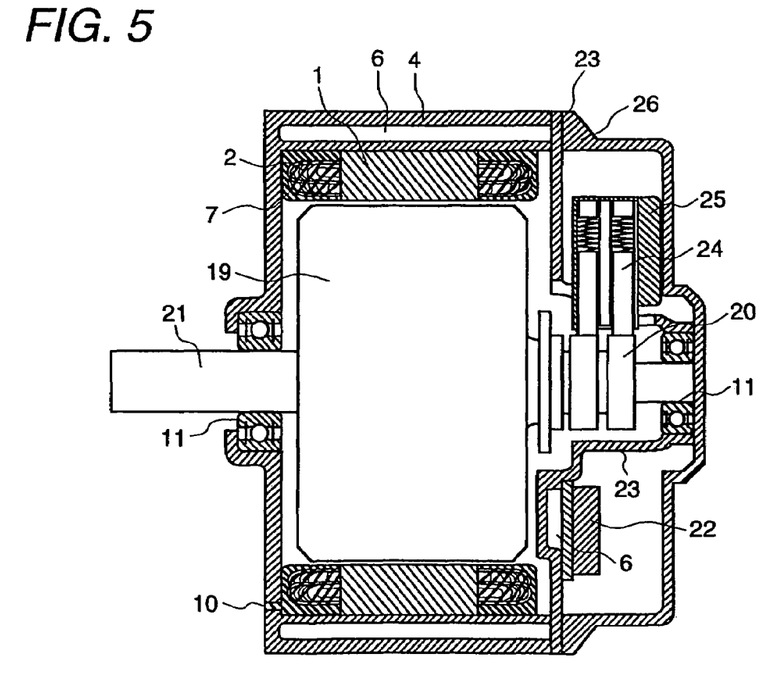
FIG. 5 is a partial cross-sectional view of the rotary machine which employs concentrated winding in the resin-molded stator pertaining to the present invention.

FIG. 5 is a cross-sectional view of the resin-molded stator shown as a comparative example against the present invention. The steps taken to manufacture this resin-molded stator are described below. A slot provided in a stator core 1 consisting of laminated electromagnetic steel plates is covered with a liner which is made of a polyamideimides non-woven fabric, and then stator coils 2 each consisting of a conductor provided with insulation are wound around the stator core 1. After this, the stator core 1 around which the stator coils 2 have been wound is built into a housing 4 which has a bearing installation recess 3 at the end of the housing. Or the housing 4 is provided with an agency 6 through which the coolant for cooling the rotary machine. Next, the housing 4 into which the stator core 1 with the stator coils 2 wound around it, is preheated to 100° C. and then set in a mold which has been heated to 150° C. beforehand. After this, the polyester-based molding resin that has been filled with the powder of calcium carbonate and aluminum oxide is injection-molded at a pressure of 4 MPa, and hereby, the stator coil 2 inside the slot of the stator core 1 and the stator coil 2 at the coil end emerging from the stator core 1 are molded.

A rotor 19 and a shaft 21 having slip rings 20 built thereinto are attached to the resin-molded stator. After this, rear plates 23 which have a diode 22 and the like, are attached, then a brush assembly 24 and a regulator 25 are installed, and a rear bracket 26 is installed.

A stringent acceleration test for increasing the output of the thus-manufactured rotary machine from the level under its stopped status to the maximum achievable level within a short time has been repeated five times, with the result that insulation breakdown has occurred between phases.

(Embodiment 2)

Figure 6:
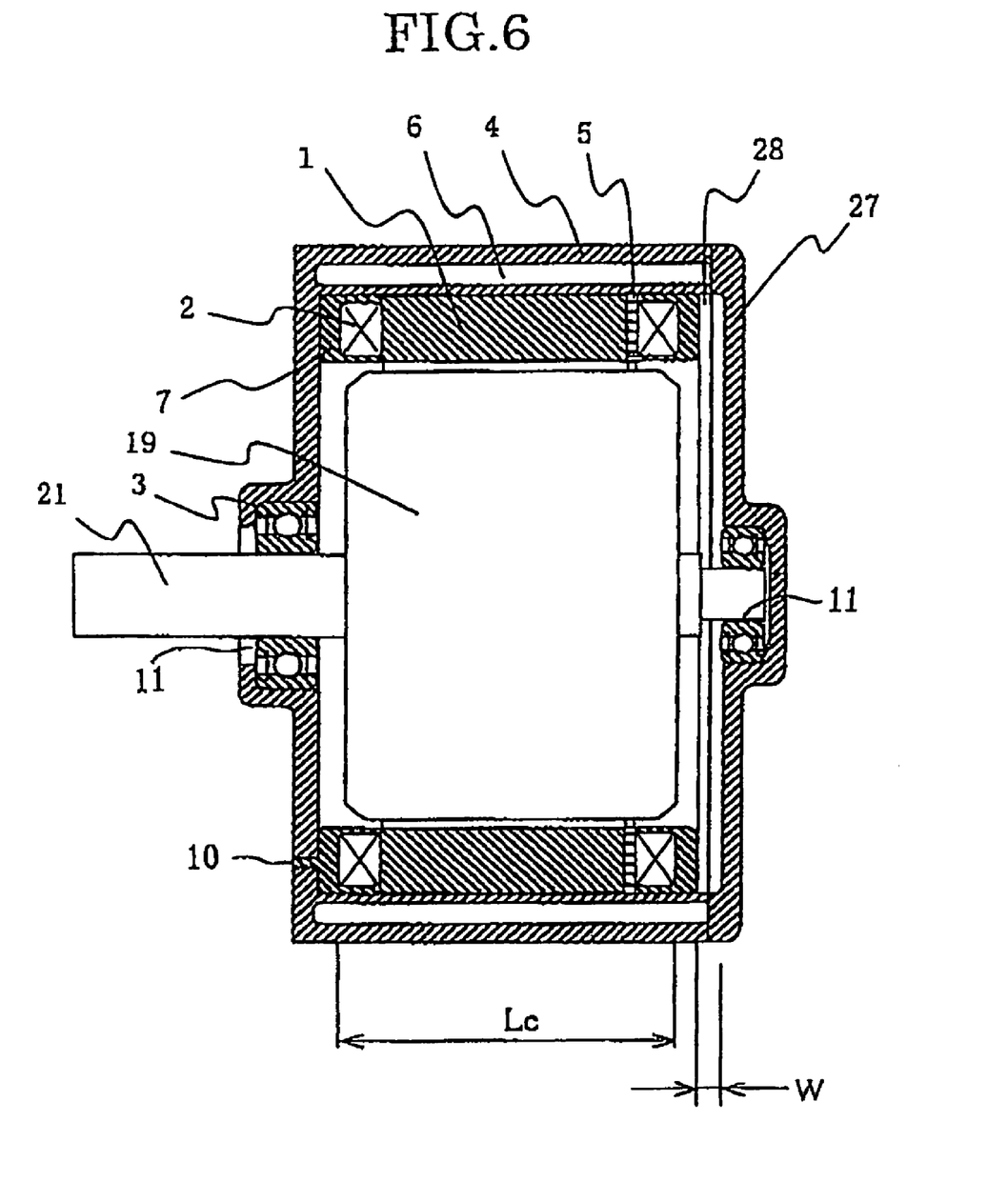
FIG. 6 is a partial cross-sectional view of a brushless rotary machine using the resin-molded stator which employs concentrated winding of the present invention.

FIG. 6 is a partial cross-sectional view of a brushless rotary machine using the resin-molded stator which employs concentrated winding in the present invention. The steps taken to manufacture this rotary machine are described below. A protrusion provided on a stator core 1 consisting of laminated electromagnetic steel plates is covered with a liner which is made of a polyamideimides non-woven fabric, and then stator coils 2 each consisting of a conductor provided with insulation are wound around the stator core 1. After this, the stator core 1 around which the stator coils 2 have been wound is built into a housing 4. Of the two surfaces vertical to the axis of the stator core 2, only the surface located at the opposite side to the bearing installation recess in the housing 4 when the stator core 1 is to be built into the housing is coated with a polytetrafluoroethylene resin film which has been pre-processed into the same shape as that of the electromagnetic steel plates of the stator core 1, and the coated surface mentioned above functions as a non-adhesive treatment section 5 to prevent bonding between the stator core 1 and the molding resin 7 to be later added. The housing 4 is also provided with an agency 6 through which the coolant for cooling the rotary machine is to be passed.

Next, the housing 4 into which the stator core 1 with the stator coils 2 wound around it, is preheated to 100° C. and then set in a mold which has been heated to 150° C. beforehand. After this, a pressure of 4 MPa is applied to the polyester-based molding resin that has been filled with the powder of calcium carbonate and aluminum oxide. Thereby, similarly to embodiment 1 described above, in the housing 4, a plurality of injection-molding gate positions 10 functioning as resin injection ports for resin-molding the housing 4 are provided circumferentially on the side thereof so as to ensure equal injection of the resin, and these gates are filled with the molding resin to provide injection-molding, with the result that the stator coil 2 inside the slot of the stator core 1 and the stator coil 2 at the coil end emerging from the stator core 1 are molded. A recess 9 for preventing the rotational vibration of the coil end portion is also provided in the housing 4.

As shown in FIG. 6, a shaft 21 into which a rotor 19 has been built is attached to the resin-molded stator. After this, an end plate 27 having a bearing mounted therein is installed. The axial length (W) of a coil end space 28 provided between the resin-molded section at the coil end portion and the rear plate 27 is set to a value equal to, or greater than, the value derived from the product of (A×T× Lc), where A is the thermal expansion coefficient of the stator coil conductor, T is the maximum temperature that the conductor reaches during the operation of the rotary machine, and Lc is the total axial length of the conductor that includes said coil end.

A stringent acceleration test for increasing the output of the thus-manufactured rotary machine from the level under its stopped status to the maximum achievable level within a short time has been repeated five times, with the result that no abnormality has been observed.

What is claimed is:

1. A rotary machine comprising a resin-molded stator, a rotor built thereinto, and a housing into which said stator and said rotor are to be stored, wherein said resin-molded stator is obtained by a method which comprises:

winding stator coils provided with insulation around a stator core comprising laminated electromagnetic steel plates, said stator core having at least one end face, axially providing the at least one end face of said stator core with a resin film or separator having a shape the same as that of a vertical section of the stator core, building the stator core provided with said stator coils into a housing, preheating said housing having said stator core built thereinto and then setting said housing in a preheated mold, and molding said stator core and said stator coils by injecting resin into the mold having said housing set therein, wherein said rotary machine comprises a rear plate for covering a side of said rotor, a brush assembly for supplying electric power via slip rings provided on said rotor, a rear bracket connected to said rear plate for covering said brush assembly, a bearing which supports one end of said rotor is provided in said housing, and a bearing which supports one end of said rotor is provided in said rear plate.

2. A rotary machine according to claim 1, wherein said housing that contain the resin-molded stator and one side of the rotor built into the stator are molded into a single unit.

3. A rotary machine comprising a resin-molded stator, a rotor built thereinto, and a housing into which said stator and said rotor are to be stored, wherein said resin-molded stator is obtained by a method which comprises:

winding stator coils provided with insulation around a stator core comprising laminated electromagnetic steel plates, said stator core having at least one end face, axially providing the at least one end face of said stator core with a resin film or separator having a shape the same as that of a vertical section of the stator core, building the stator core provided with said stator coils into a housing, preheating said housing having said stator core built thereinto and then setting said housing in a preheated mold, and molding said stator core and said stator coils by injecting resin into the mold having said housing set therein, wherein a space for absorbing axial thermal expansion of said stator coils is provided at a side having said non-adhesive structure.

4. A rotary machine according to claim 1, wherein said space is provided between said rear plate and the molding resin of said stator coils or between said end plate and the molding resin of said stator coils.

5. A rotary machine according to claim 4, wherein said rotary machine has a structure where the size (W) of the space between said end plate and the molding-resin end portion having said non-adhesive structure is equal to, or greater than, the value derived from the product of (A×T×Lc), where A is the thermal expansion coefficient of the stator coil conductor, T is the maximum temperature that the conductor reaches during operation, and Lc is the total axial length of the conductor that includes said coil end.

6. A rotary machine comprising a resin-molded stator, a rotor built thereinto, and a housing into which said stator and said rotor are to be stored, wherein said resin-molded stator is obtained by a method which comprises:

winding stator coils provided with insulation around a stator core comprising laminated electromagnetic steel plates, said stator core having at least one end face, axially providing the at least one end face of said stator core with a resin film or separator having a shape the same as that of a vertical section of the stator core, building the stator core provided with said stator coils into a housing, preheating said housing having said stator core built thereinto and then setting said housing in a preheated mold, and molding said stator core and said stator coils by injecting resin into the mold having said housing set therein, wherein said rotary machine has insert structure in which the axial length of said housing at its inner circumferential side is greater than the axial length of said resin-molded stator and in which said housing and the molding resin separated from said core by the non-adhesive structure provided at the core end of the stator can be moved in the respective axial directions and cannot be moved about the respective axes.

7. A rotary machine according to claim 1, wherein said housing is provided with a resin-molding gate on one of the sides provided in said axial direction.

8. A rotary machine comprising a resin-molded stator, a rotor built thereinto, and a housing into which said stator and said rotor are to be stored, wherein said resin-molded stator is obtained by a method which comprises:

winding stator coils provided with insulation around a stator core comprising laminated electromagnetic steel plates, said stator core having at least one end face, axially providing the at least one end face of said stator core with a resin film or separator having a shape the same as that of a vertical section of the stator core, building the stator core provided with said stator coils into a housing, preheating said housing having said stator core built thereinto and then setting said housing in a preheated mold, and molding said stator core and said stator coils by injecting resin into the mold having said housing set therein, wherein the section of said housing that is to contain said resin-molded stator is provided with a space which functions as a cooling agency.

* * * * *